United States Patent
Calton et al.

[11] 3,710,068
[45] Jan. 9, 1973

[54] PREHEATING OF WELDING SLAG FOR BETTER STARTING

[75] Inventors: Ernest Calton; Arthur Spencer, both of Sheffield, England

[73] Assignee: British Steel Corporation, London, England

[22] Filed: Jan. 20, 1971

[21] Appl. No.: 107,958

[30] Foreign Application Priority Data

Feb. 3, 1970 Great Britain.......................5,118/70

[52] U.S. Cl....................................219/73, 219/126
[51] Int. Cl. ...............................................B23k 9/18
[58] Field of Search........................219/73, 137, 126

[56] References Cited

UNITED STATES PATENTS 2,937,422  5/1960  Böhme..............................219/73 X

FOREIGN PATENTS OR APPLICATIONS 224,731  12/1968  U.S.S.R.

Primary Examiner—C. L. Albritton
Assistant Examiner—George A. Montanye
Attorney—Bacon & Thomas

[57] ABSTRACT

A method of producing an electroslag welded bond between spaced metal bodies. In particular a trough is located beneath the bodies so as to bridge the whole length of the gap between them and slag in either a molten or a dry powdered state is placed in the trough and pre-heated by a source (e.g., an induction coil) operative to produce uniform heat transfer along the whole length of the gap to facilitate the start of welding.

8 Claims, 3 Drawing Figures

PATENTED JAN 9 1973

3,710,068

INVENTORS
ERNEST CALTON
ARTHUR SPENCER
BY Bacon & Thomas ATTORNEYS

PREHEATING OF WELDING SLAG FOR BETTER STARTING

This invention relates to electroslag welding and is particularly concerned with starting an electroslag welding process for bonding together adjacent ends of spaced metal bodies.

Metal components are often produced by techniques such as casting and forging, but in some instances they may be of such a size or shape that it is difficult to produce the complete component from a single primary block of starting material. In such cases two or more primary blocks are usually combined as an intermediate step in manufacture.

If conventional welding techniques are employed in which a welding filler material is melted by gas combustion or by an electric arc they are, in general, unsuitable due to their inability to provide a homogeneous weld over the whole of the relatively large areas involved in such cases.

Accordingly, it has been proposed in such cases to produce a homogeneous bond over large areas by another process, namely, that of electroslag welding. In this process, the gap between the opposed surfaces of adjacent bodies is arranged to be partially filled with a slag which is then melted. In this condition the slag is electrically conducting. Electric current is subsequently passed through the molten slag between a partially immersed consumable welding electrode and the workpiece bodies. In this condition the heat generated by the current melts metal from the tip of the welding which is continuously fed to a constant immersion depth in the slag, so that molten metal passes into a pool at the base of the gap. Prior to progressively freezing upwardly from the base, the pool forms a homogeneous bond over the whole covered area of the opposed faces of the workpiece bodies as the level of molten metal, together with the overlying slag layer, rises.

One major drawback in such a process is the difficulty inherent in initially melting the slag in the gap and maintaining it at a temperature which is both sufficient to enable welding to start at the gap base and is uniform along the gap, and a number of methods to overcome this have been proposed. One such method comprises pouring in the slag whilst it is already molten but this has serious drawbacks arising not only from the rapid cooling of the slag but more importantly to the highly selective rate of cooling which occurs by thermal contact with the sides. Such selective cooling becomes very significant when the workpiece bodies to be welded define a gap having a relatively large length, for example, of the order of 4 or 5 feet.

A similar difficulty arises with alternative methods of slag melting, e.g., by passing arcing current across the gap to be welded itself — this also gives rise to spattering.

In all these cases difficulty is experienced in starting the welding process and the difficulty encountered in equalizing current flow along the length of the gap produces significant temperature differences giving rise to an unsound weld at the gap base. It is an object of the present invention to reduce these difficulties.

According to one aspect of the present invention, there is provided a method of producing an electroslag welded bond between spaced metal bodies in which a trough is located beneath the bodies so as to bridge the whole length and width of the gap between them, and in which slag is placed in the trough and is pre-heated by a source effective to produce uniform heat transfer along the whole length of the gap to facilitate the start of welding.

According to another aspect of the present invention, there is provided apparatus for producing an electroslag welded bond between spaced metal bodies, comprising a trough so dimensioned as to bridge the whole length and width of the gap between the bodies, and a heating source associated with the trough for heating slag in the trough and which is effective to produce uniform heat transfer along the whole length of the gap to facilitate the start of welding.

The heating source is preferably an electrically energized coil which is wound around the trough. Alternatively, the source may comprise a resistance heating element running through the trough, e.g., a rod of carbon or silicon carbide. The slag may be introduced either in a molten state or as a dry powder.

Preferably the metal bodies are pre-heated by an auxiliary source to reduce the rate at which heat is dissipated from the weld-bonded surfaces. Again, induction heating may be employed for this purpose.

By heating the slag uniformly in accordance with this invention, any tendency for welding electrodes spaced along the length of the gap to carry current differentially is reduced, and the quality of the welded bond is improved. In addition, uniform heating ensures that all the slag at the base of the slag is molten and this accordingly avoids the production of any unsound welded regions, particularly those arising from the presence of solid slag inclusions.

In order that the invention may be fully understood, two embodiments thereof will now be described with reference to the accompanying drawings, in which.

Figure 2:
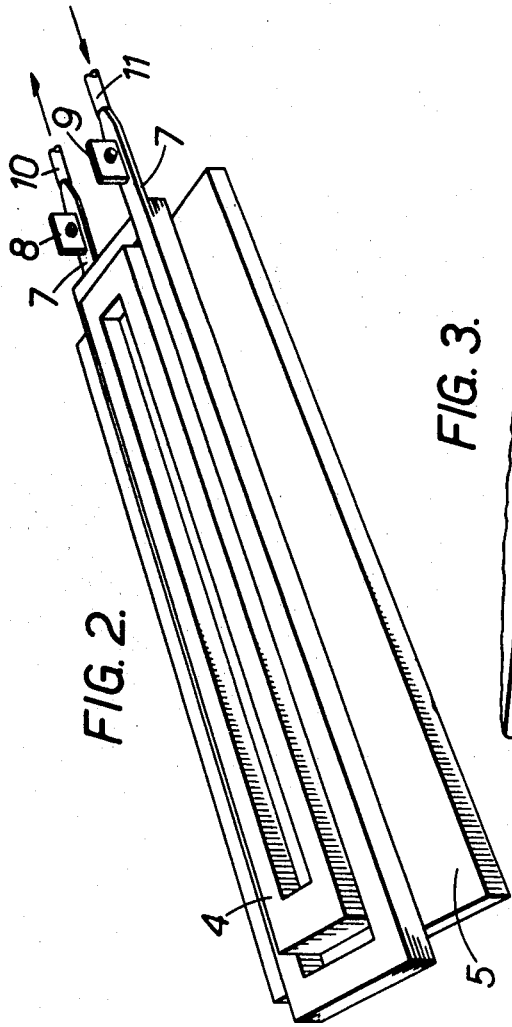
FIG. 2 is a perspective view of the trough and the coil shown in FIG. 1.
Figure 1:
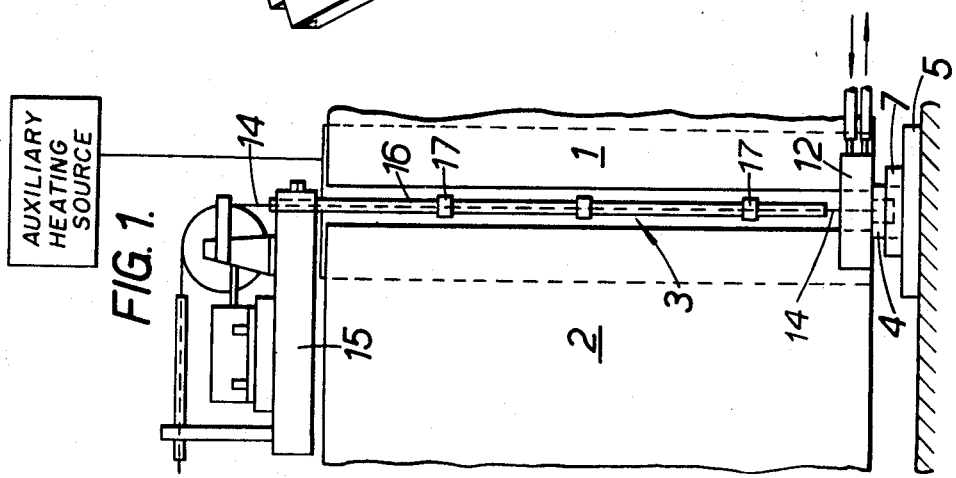
FIG. 1 is a side view of apparatus for carrying out a slag welding process according to this invention with the spaced metal bodies in position.

Referring now to FIGS. 1 and 2, two large steel sections 1, 2 to be welded together are individually supported from below and are spaced apart to define a gap 3. Mounted beneath, and in contact with, these sections is a metal trough 4, this trough bridging the gap 3 and being mounted on a base plate 5. Extending around this trough is a coil comprising a serially wound water-cooled conductor 7 with stacked turns and having terminals 8, 9 for connection to an a.c. electrical supply. The conductor is in the form of a rectangular-section tube and its ends are connected to hoses 10, 11 for water cooling. The coil lies on the base plate 5 and is insulated by, e.g., tape, wound around the turns, but this has not been shown in the interests of clarity.

Mounted on the ends of the trough and secured to the sides of the steel section 1, 2 are two water-cooled plates or "shoes" 12, one on each side of these sections, which serve to contain the molten metal and the overlying slag as it rises during the welding process, as will be described.

Consumable welding electrodes in the form of, e.g., nickel-chromium alloy wires 14, are spaced along the length of the gap and are driven from a source (not shown) over pulleys mounted on a supporting bracket 15. Clamped to this bracket and dependent from it are a series of consumable guide tubes 16 through which the associated welding wires are fed into the weld pool. Bobbins or ferrules 17 of insulating material are positioned over these tubes at intervals in order to ensure that it they tend to stray towards either of the sections 1, 2 they are not welded to it.

Auxiliary induction heaters are mounted around the sections 1, 2 in order to preheat them.

In operation, the induction heater (coil 7) is energized and molten slag is passed into the trough. This slag may conveniently be rich in the oxides of silicon, calcium, aluminum, manganese and magnesium for the purpose under discussion. The a.c. supply for the welding wires is then connected between these wires and the two metal sections and the wires are fed down through their guide tubes 16 by a motorized drive. As the ends of the wires are immersed into the molten slag the heat generated by the current causes the wire ends to melt and pass through the slag so that a molten 'weld pool' forms beneath it, initially in the trough and then rising steadily to bridge the two sections 1, 2 as the wires are continually fed forward and melted. This pool thus forms a homogeneous bond between the opposed faces of the metal sections and is effective to weld the gap between them as it progressively solidifies upwardly.

As the molten pool and the overlying slag layer rises fresh water-cooled shoes 12 are placed in position one on top of the other so as to contain the melt.

As mentioned above, the guide tubes are themselves consumable and they melt progressively as the level rises, and the same applies to the insulating bobbins on these tubes. In particular, the composition of these 'spacers' may be the same as that of the slag e.g., as described in our U.K. Pat. application No. 988 filed on Jan. 8, 1971.

At the completion of the weld, the bonded sections are removed and the underlying trough is machined off, together with other surface irregularities. In this respect, for non-rectangular mating sections, e.g., circular shafts, it may be convenient to weld on, over their ends, rectangular-section cheeks, having a central circular aperture to accommodate the shafts so that the ends of the shafts are aligned with their cheeks. The trough is then placed beneath these cheeks in contact with them and the shoes are placed in position over their sides. Subsequent to the welding operation, these cheeks are removed in turn with the trough.

Figure 3:
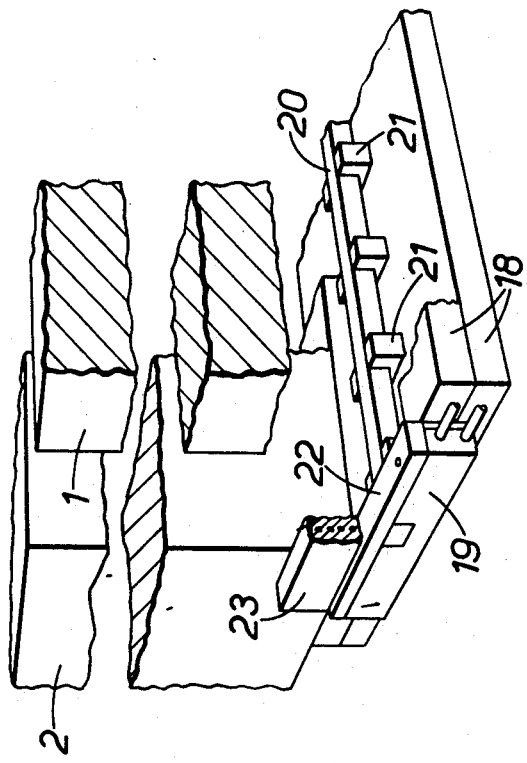
FIG. 3 is a part-sectional view of a modification of the apparatus shown in FIG. 1.

Referring now to FIG. 3, there is shown an alternative arrangement in which the slag is heated by a resistance heater to facilitate starting. In this instance a channel-section trough or block 18 is located in position to bridge the gap between the metal sections 1, 2. Secured to the ends of the block through insulating gaskets are two water-cooled conductive shoes 19 which have connected between them, and running along the channel defined by the block, a heater rod 20 of carbon or the like. Insulating spacers 21 made from, e.g., an asbestos composition, are provided at intervals along the length of this rod in order to support it, especially at elevated temperatures, whilst effecting a minimum impedance to the heat transfer from the rod to the slag. A strip of insulating material 22 is provided on the upper surface of each of the shoes 19 so as to provide an insulation from other shoes mounted on it, e.g., shoes 23, as the weld pool and the overlying slag layer rises.

The welding operation in the FIG. 3 embodiment is effected in the same manner as before with molten or powdered slag being passed into the trough before starting.

In accordance with this invention, the slag at the base of the gap is maintained at a uniform temperature along its whole length so that selective cooling is avoided which, in turn, gives rise to more stable starting conditions when the welding wires are lowered into contact. In addition, the uniform temperature of the slag ensures that none of the spaced welding wires carry a differentially disproportionate load which could result in an uneven welded bond being formed. A further advantage which arises is that the starting period may well be cut from the conventional 30 to 45 minutes for a job of the nature illustrated, to, say, between 10 to 15 minutes, due to the welding being started from the instant that the wires are immersed in the molten slag.

We claim:

1. A method of producing an electroslag welded bond between spaced metal bodies by consumable electrode welding comprising the steps of locating beneath the bodies so as to bridge the whole length and width of the gap between them, mounting an electrically energizable coil around the trough, placing slag in the trough, energizing the coil and pre-heating the slag by electrical induction from said coil thereby producing uniform heat transfer along the whole length of the gap during starting, and forming said welded bond by immersing consumable welding electrodes in the slag and passing current through them.

2. A method according to claim 1, wherein the slag is placed in the trough as a dry powder.

3. A method of producing an electroslag welded bond between spaced metal bodies by consumable electrode welding comprising the steps of locating a trough beneath the bodies so as to bridge the whole length and width of the gap between them, mounting a resistance heater in the form of a rod so that it extends along the whole length of the trough, placing slag in the trough, electrically energizing the resistance heater and preheating the slag thereby producing uniform heat transfer along the whole length of the gap during starting, and forming said welded bond by immersing consumable welding electrodes in the slag and passing current through them.

4. A method according to claim 3, wherein the slag is placed in the trough in a molten state.

5. A method according to claim 3, wherein the slag is placed in the trough as a dry powder.

6. A method of producing an electroslag welded bond between spaced metal bodies by consumable electrode welding comprising the steps of locating a trough beneath the bodies so as to bridge the whole length and width of the gap between them, placing slag in the trough, electrically preheating the slag thereby producing uniform heat transfer along the whole length of the gap, immersing consumable welding electrodes into the slag and passing current through them whereby to produce a welded bond between the said bodies.

7. A method according to claim 6, wherein the metal bodies are separately heated by an auxiliary source.

8. Apparatus for producing an electroslag welded bond between spaced metal bodies by consumable electrode welding, comprising: means for supporting metal bodies in spaced relationship whereby to define a gap between them, said means including a trough disposed below a gap for receiving and for holding slag and so dimensioned as to bridge the whole length and width of a gap between two spaced metal bodies, and an electrical heating source disposed on said trough for heating slag in the trough and which is effective to produce uniform heat transfer along the whole length of the trough to facilitate the start of welding; means for advancing consumable electrodes and feeding them toward the trough; and means for passing current through the electrodes for melting them.

* * * * *

UNITED STATES PATENT OFFICE
CERTIFICATE OF CORRECTION

Patent No. 3,710,068          Dated January 9, 1973

Inventor(s) Ernest Calton and Arthur Spencer

It is certified that error appears in the above-identified patent and that said Letters Patent are hereby corrected as shown below:

Column 1, line 32 (note that the numeral 30 in the margin is misplaced), after "welding" insert --electrode--.

Column 3, line 10, change "it" to --if--.

Column 4, line 28 (third line of Claim 1) after "locating" insert --a trough--.

Signed and sealed this 29th day of May 1973.

(SEAL)
Attest:

EDWARD M. FLETCHER, JR.         ROBERT GOTTSCHALK
Attesting Officer              Commissioner of Patents